US007486896B2

(12) United States Patent
Von Lerber

(10) Patent No.: US 7,486,896 B2
(45) Date of Patent: Feb. 3, 2009

(54) OPTICAL CLOCK RECOVERY

(75) Inventor: Tuomo Von Lerber, Helsinki (FI)

(73) Assignee: Luxdyne Oy, Helsinki (FI)

( * ) Notice: Subject to any disclaimer, the term of this patent is extended or adjusted under 35 U.S.C. 154(b) by 482 days.

(21) Appl. No.: 11/219,801

(22) Filed: Sep. 7, 2005

(65) Prior Publication Data

US 2007/0053691 A1    Mar. 8, 2007

(51) Int. Cl.
*H04B 10/00* (2006.01)
*H04B 10/06* (2006.01)
(52) U.S. Cl. .................. 398/155; 398/162; 398/173; 398/175; 398/212; 398/214
(58) Field of Classification Search ............ 398/155, 398/162, 173, 175, 178, 202, 212, 214
See application file for complete search history.

(56) References Cited

U.S. PATENT DOCUMENTS

| 5,339,185 | A | 8/1994 | Kaede | |
|---|---|---|---|---|
| 6,813,447 | B2 * | 11/2004 | Ellis et al. | 398/155 |
| 7,116,917 | B2 * | 10/2006 | Miyamoto et al. | 398/185 |
| 7,162,162 | B2 * | 1/2007 | Lee et al. | 398/155 |
| 7,233,430 | B2 * | 6/2007 | Caplan | 359/325 |

FOREIGN PATENT DOCUMENTS

| JP | 63177626 A | 7/1988 |
|---|---|---|
| JP | 2126243 A | 5/1990 |
| WO | WO 2005/046095 A1 | 5/2005 |

OTHER PUBLICATIONS

Zhou et al., A Performance Analysis of an All-Optical Clock Extraction Circuit Based on Fabry-Perot Filter, May 2001, Journal of Lightwave Technology, vol. 19, No. 5.*
Lee et al., All-Optical Clock Recovery from NRZ Data of 10 Gb/s, Jun. 1999, IEEE Photonics Technology Letters, vol. 11, No. 6.*
Zhou et al; A Performance Analysis of an All-Optical Clock Extraction Circuit Based on Fabry-Perot Filter; Journal of Lightwave Technology, vol. 19, No. 5, May 2001; pp. 603-613.

(Continued)

*Primary Examiner*—Kenneth N Vanderpuye
*Assistant Examiner*—Daniel G Dobson
(74) *Attorney, Agent, or Firm*—Venable LLP; Eric J. Franklin

(57) ABSTRACT

The invention relates to clock recovery in optical communication systems. Optical clock frequencies are recovered from a plurality of optical channels by using a single optical resonator. The optical resonator is matched with the carrier frequencies and the sideband frequencies of the data signals sent at different channels. The separation range of the optical resonator is selected such that the clock frequency of at least one data signal is substantially equal to the separation range of the optical resonator multiplied by an integer greater than or equal to two. The method according to the invention allows the use of different clock frequencies at different optical channels. Furthermore, the method provides considerable freedom to select the spectral positions of the optical channels.

28 Claims, 10 Drawing Sheets

OTHER PUBLICATIONS

Wang et al; A Simple Method for Clock Recovery; Optics and Laser Technology; vol. 36, No. 8, pp. 613-616.

Mikhailov et al; All-Optical Multiwavelength Clock Recovery Using Integrated Semiconductor Amplifier Array Module; Electronics Letters; vol. 37, No. 4, 2001; pp. 232-234.

PCT/ISA/210—International Search Report.

PCT/ISA/237—Written Opinion of the International Searching Authority.

Masahiko Jinno and Takao Matsumoto; Optical Tank Circuits Used for All-Optical Timing Recovery; IEEE Journal of Quantum Electronics; Apr. 1992; pp. 895-900; vol. 28 No1 4.

H.K. Lee, J.T. Ahn, M.-Y. Jeon, K.H. Kim, D.S. Lim and C.-H. Lee; All-Optical Clock Recovery from NRZ Data of 10 Gb/s; IEEE Photonics Technology Letters; Jun. 1999; pp. 730-732; vol. 11 No. 6.

\* cited by examiner

OPTICAL CLOCK RECOVERY

FIELD OF THE INVENTION

The present invention relates to clock recovery in optical communication systems.

BACKGROUND OF THE INVENTION

Optical clock recovery is needed e.g. to synchronize receivers with transmitters in optical communication systems, especially in all-optical systems having modulation frequencies in the order of 10 GHz or above.

The article "Optical Tank Circuits Used for All-Optical Timing Recovery", by M. Jinno and T. Matsumoto, IEEE Journal of Quantum Electronics Vol. 28, No. 4 Apr. 1992, pp. 895-900, discloses a method for optical clock recovery. An optical clock signal synchronized to an incoming data stream is generated by extracting line spectral components in the incoming data stream using an optical resonator whose free spectral range is equal to the incoming data bit rate.

SUMMARY OF THE INVENTION

The object of the present invention is to provide a method for optical clock signal recovery. Another object of the present invention is to provide an optical communication system based on said method. The object of the present invention is also to provide a device based on said method.

According to a first aspect of the invention there is a method to recover at least one optical clock frequency associated with an optical signal, said optical signal comprising at least:
 a first data signal, and
 a second data signal, said method comprising:
 coupling said optical signal to an optical resonator,
 setting one of the pass bands of the optical resonator substantially to a spectral peak of the first data signal,
 selecting the separation range of said optical resonator such that
  the clock frequency of the first data signal is substantially equal to the separation range of the optical resonator multiplied by a first integer greater than or equal to two, and such that
  the separation between said spectral peak of the first data signal and a spectral peak of the second data signal is substantially equal to the separation range of the optical resonator multiplied by a second integer, and
 separating frequency components associated with said first data signal from the output of said optical resonator to provide a beat signal.

According to a second aspect of the invention there is an optical system comprising at least:
 an optical transmitter adapted to send an optical signal comprising at least a first data signal and a second data signal, and
 an optical resonator, wherein one of the pass bands of the optical resonator is adapted to be substantially at a spectral peak of the first data signal, and the separation range of the optical resonator is adapted such that
  the clock frequency of the first data signal is substantially equal to the separation range of the optical resonator multiplied by a first integer greater than or equal to two, and such that
  the separation between the spectral peak of the first data signal and a spectral peak of the second data signal is substantially equal to the separation range of the optical resonator multiplied by a second integer.

According to a third aspect of the invention there is a device to recover at least one clock frequency associated with an optical signal, said optical signal comprising at least:
 a first data signal, and
 a second data signal, said device comprising at least:
 an optical resonator, wherein one of the resonance peaks of the optical resonator is adapted to be substantially at a spectral peak of the first data signal, the separation range of the optical resonator being adapted such that
  the clock frequency of the first data signal is substantially equal to the separation range of the optical resonator multiplied by a first integer greater than or equal to two, and such that
  the separation between said spectral peak of the first data signal and a spectral peak of the second data signal is substantially equal to the separation range of the optical resonator multiplied by a second integer, and
 frequency separating means to provide a beat signal by separating from the output of said optical resonator frequency components associated with said first data signal.

An optical resonator is a device which has a capability to wavelength-selectively store optical energy carried at one or more optical frequencies. Consequently, an optical resonator may provide optical signals for some time also during periods when no optical energy is coupled to the resonator. When a resonator is matched with at least two spectral peaks of a optical data signal such that the spectral separation of the spectral peaks is equal to the clock frequency, then the output of the optical resonator may be used as an uninterrupted clock signal.

According to the present invention, the clock frequency associated with at least one optical data signal is substantially equal to the separation range of the optical resonator multiplied by an integer greater than or equal to two. The separation range means the separation between adjacent resonance frequencies of the optical resonator.

Clock frequencies are recovered from a plurality of optical channels by using a single optical resonator. The method according to the present invention provides considerable freedom to select the spectral positions of the optical channels, and the associated clock frequencies. Different clock frequencies may be used at different optical channels. The frequency separation between adjacent optical channels need not to be an integer multiple of a clock frequency.

The embodiments of the invention and their benefits will become more apparent to a person skilled in the art through the description and examples given herein below, and also through the appended claims.

BRIEF DESCRIPTION OF THE FIGURES

In the following examples, the embodiments of the invention will be described in more detail with reference to the appended drawings, in which.

DETAILED DESCRIPTION

Figure 1:
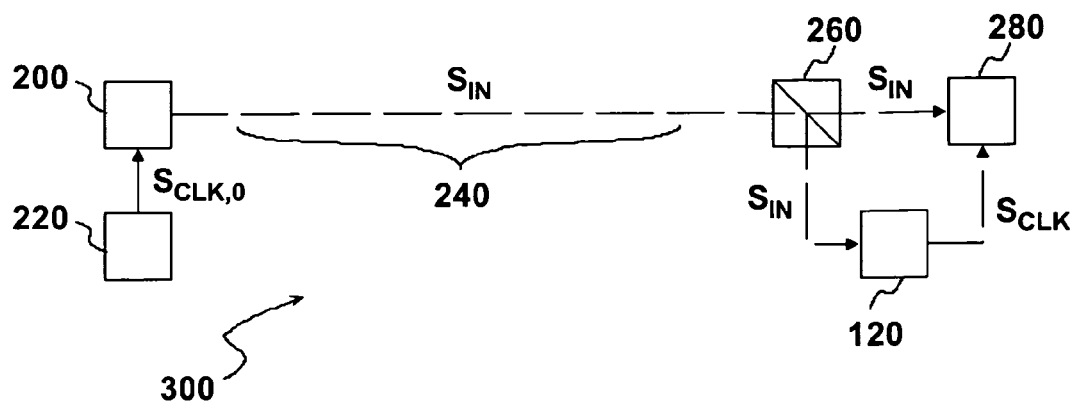
FIG. 1 shows a block diagram of an optical communication system.

Referring to FIG. 1, an optical communication system 300 comprises an optical transmitter 200, an optical receiver 280 and an optical transmission path 240. The optical transmission path 240 may be e.g. an optical fiber. The optical signal $S_{IN}$ sent by the transmitter 200 is carried through the transmission path 240. The modulation of the optical signal $S_{IN}$ is controlled by a clock signal $S_{CLK,0}$ provided by a clock 220. The receiver 280 is synchronized with the incoming optical signal $S_{IN}$ by using a clock signal $S_{CLK}$ recovered by a clock recovery device 120. The optical signal $S_{IN}$ may be split into parts by a splitter 260.

The optical communication system 300 may comprise a splitter to divide the incoming optical signal $S_{IN}$ into parts. The clock 220 may be a part of the transmitter 200. In case of multi-channel transmission, the clock signal $S_{CLK,0}$ may consist of several signals having different frequencies.

Figure 2:
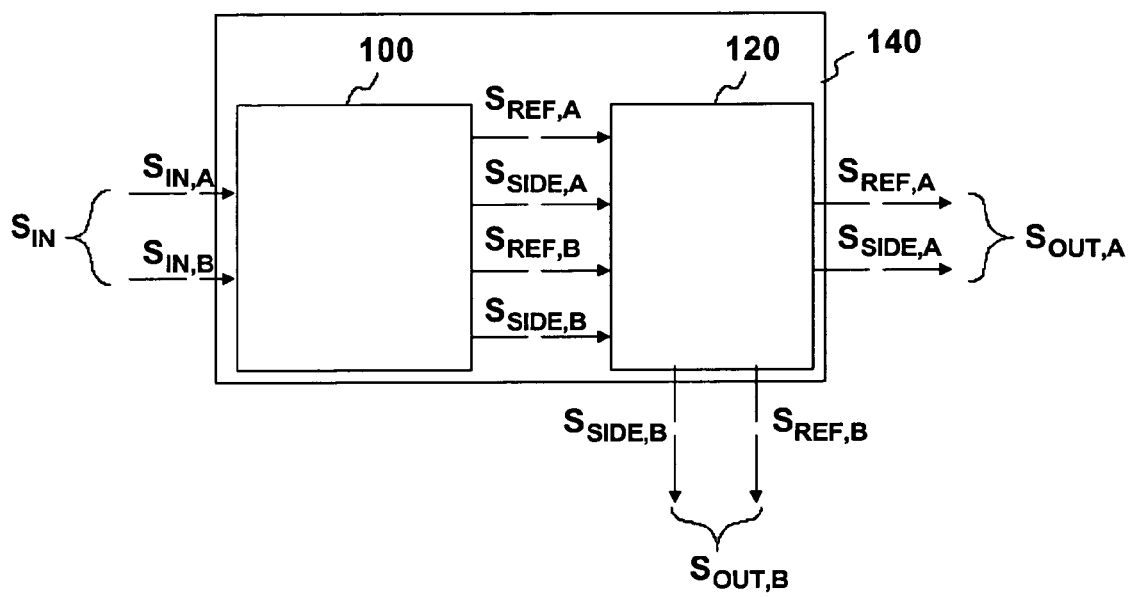
FIG. 2 shows a block diagram of a clock recovery device.

Referring to FIG. 2, the clock recovery device 140 comprises an optical resonator 100. The optical signal $S_{IN}$ comprises at least two modulated data signals $S_{IN,A}$, $S_{IN,B}$ sent at different optical channels. The data signals $S_{IN,A}$, $S_{IN,B}$ may have the same clock frequency or they may have different clock frequencies.

Figure 7:
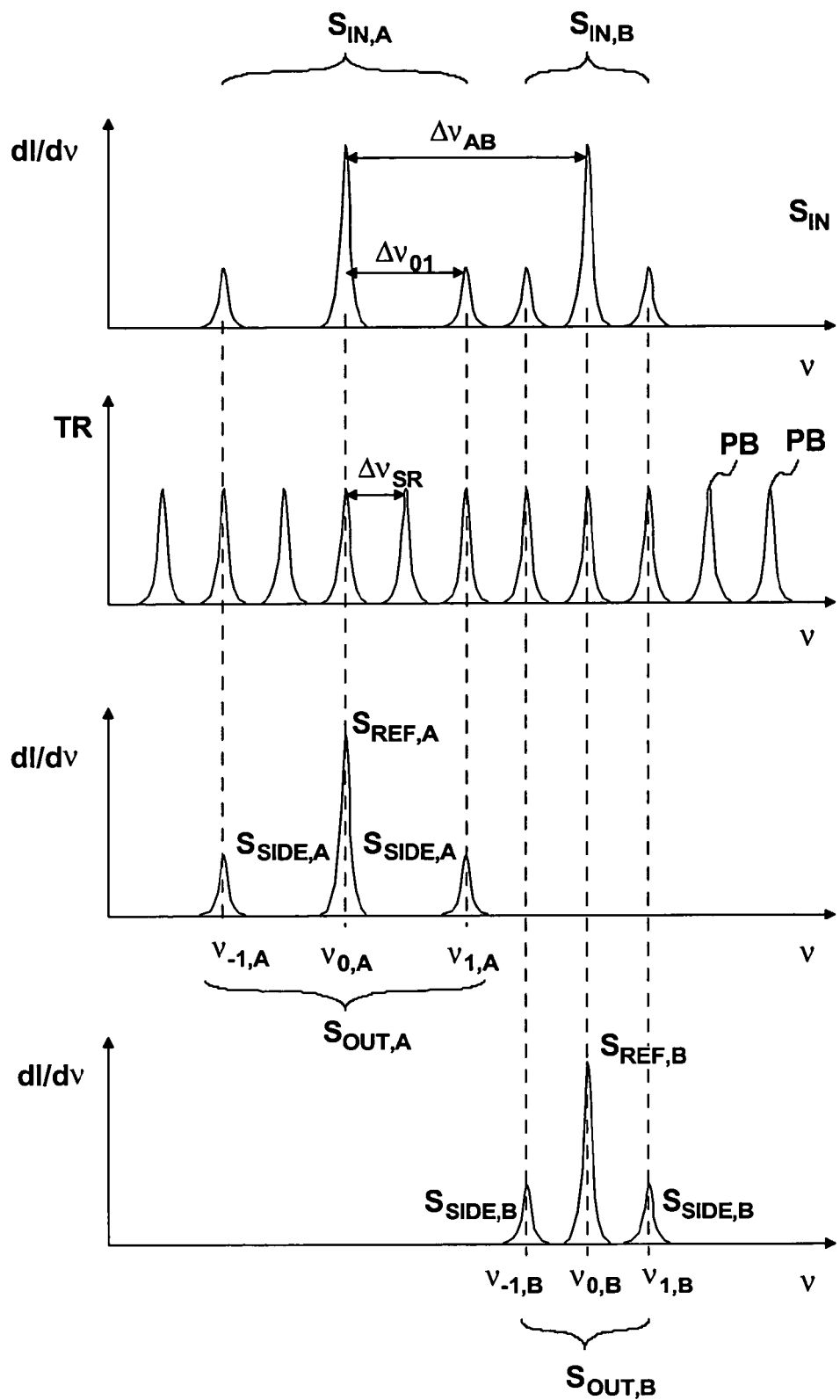
FIG. 7 shows schematically the processing of the optical data signals comprising a spectral peak at a carrier frequency.

The first data signal $S_{IN,A}$ has one or more sideband components which correspond to the modulation of the signal (FIG. 7). At least one of the sideband components is processed using the optical resonator 100 to provide a sideband signal $S_{SIDE,A}$. A frequency component at the carrier frequency of the data signal $S_{IN,A}$ may be processed by using the optical resonator 100 to provide a reference signal $S_{REF,A}$.

At least one of the sideband components of the second data signal $S_{IN,B}$ is processed using the optical resonator 100 to provide a sideband signal $S_{SIDE,B}$. A frequency component at the carrier frequency of the data signal $S_{IN,B}$ may be processed by using the optical resonator 100 to provide a reference signal $S_{REF,B}$.

However, in cases when the spectral component at the carrier frequency is substantially or completely suppressed, the reference signals $S_{REF,A}$ and/or $S_{REF,A}$ may also be formed by processing further sideband components of the data signal $S_{IN,A}$ or $S_{IN,B}$.

The spectral positions of the pass bands of the optical resonator 100 are set such that the spectral components of the selected spectral components are transmitted by the optical resonator 100 forming the output $S_{OUT}$ of the optical resonator 100. Thus, the output $S_{OUT}$ of the optical resonator 100 comprises at least two reference signals $S_{REF,A}$, $S_{REF,B}$ and at least two sideband signals $S_{SIDE,A}$ and $S_{SIDE,B}$. Typically, the signals $S_{REF,A}$, $S_{REF,B}$ $S_{SIDE,A}$ and $S_{SIDE,B}$ propagate substantially along the same optical path.

Advantageously, the clock recovery device 140 comprises a frequency separation unit 120 to spectrally separate frequency components associated with the first data signal $S_{IN,A}$ from the output $S_{OUT}$ of the optical resonator 100. The frequency separation unit 120 may also be adapted to separate frequency components associated with further data signals. The frequency separation unit may be based e.g. on an interference filter, an optical resonator, a diffraction grating or an arrayed waveguide grating, or a combination thereof.

Figure 3:
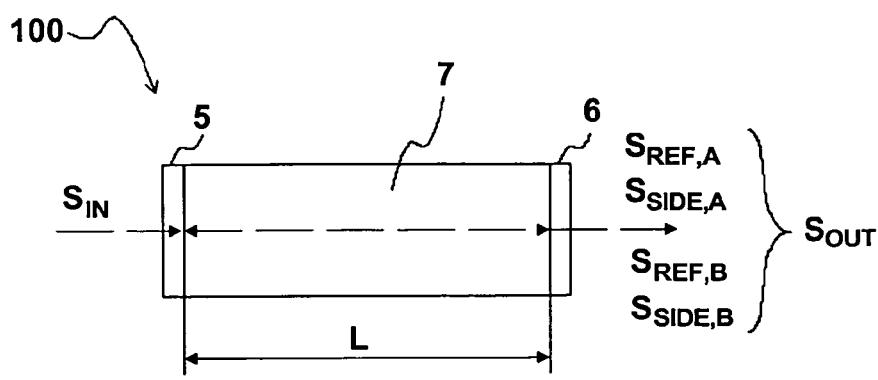
FIG. 3 shows schematically an optical resonator based on a cavity between reflectors.

Referring to FIG. 3, the optical resonator 100 may comprise an optical cavity 7 defined by at least two reflectors 5, 6. L denotes the optical length of the cavity 7. The optical length L is equal to the distance between the reflectors 5, 6 multiplied by the refractive index of the cavity medium. The resonator 100 acts as a band pass filter having a plurality of pass bands, which coincide with the optical resonance frequencies of the resonator 100. The reflectors 5, 6 may be e.g. planar or spherical reflective surfaces. In case of planar reflective surfaces, adjacent resonance frequencies are separated by a separation range $\Delta v_{SR}$ given by $$\Delta v_{SR} = \frac{c}{2L}, \quad (1)$$

where c is the speed of light in vacuum.

The separation range $\Delta v_{SR}$ may be substantially constant over a predetermined range of optical frequencies. In order to implement a constant separation range, the cavity 7 may be non-dispersive. Alternatively, the resonator 10 may comprise further elements to compensate dispersion. On the other hand, the resonator 10 may also be dispersive to provide a varying separation range $\Delta v_{SR}$. Such a resonator may be used e.g. in applications where the pass bands should coincide with several optical channels which have non-equal separations in the frequency domain.

Figure 4:
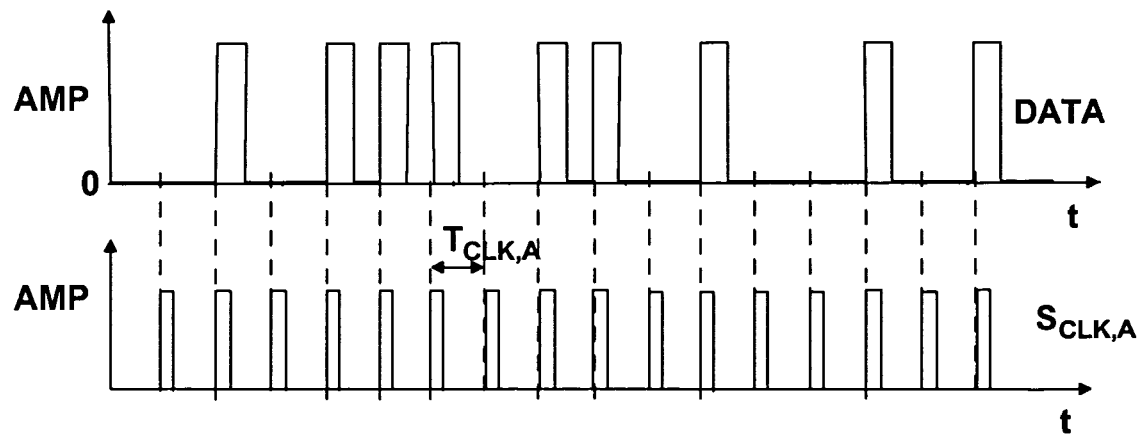
FIG. 4 shows, by way of example, a return-to-zero modulated data signal consisting of a sequence of rectangular pulses, and a clock signal associated with said data signal.

Referring to the upper curve of FIG. 4, a data signal DATA may consist of a sequence of substantially rectangular pulses. The data signal DATA shown in FIG. 4 is modulated according to the return-to-zero (RZ) format. t denotes time and AMP denotes amplitude. The data signal DATA may be an optical signal, or it may be an electrical signal. The timing of the data pulses is controlled by the clock signal $S_{CLK,A}$, which is shown by the lower curve of FIG. 4. The time period between two consecutive clock pulses is $T_{CLK,A}$. The frequency $v_{CLK,A}$ of the clock is equal to $1/T_{CLK,A}$, respectively.

Figure 5:
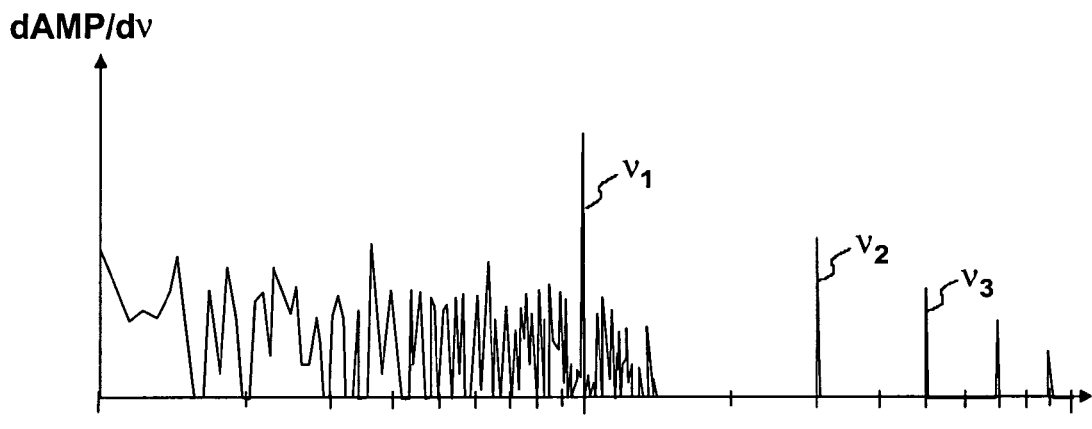
FIG. 5 shows the frequency composition of the data signal according to FIG. 4.

FIG. 5 shows the frequency decomposition of the data signal DATA according to FIG. 4. v denotes frequency. The ordinate and the abscissa values are shown in logarithmic scale. The frequency decomposition exhibits several distinctive spectral peaks at the modulation frequencies $v_1$, $v_2$, $v_3$, . . . The lowest modulation frequency $v_1$ is equal to the clock frequency $v_{CLK,A}$ associated with the data sequence according to FIG. 4.

Figure 6:
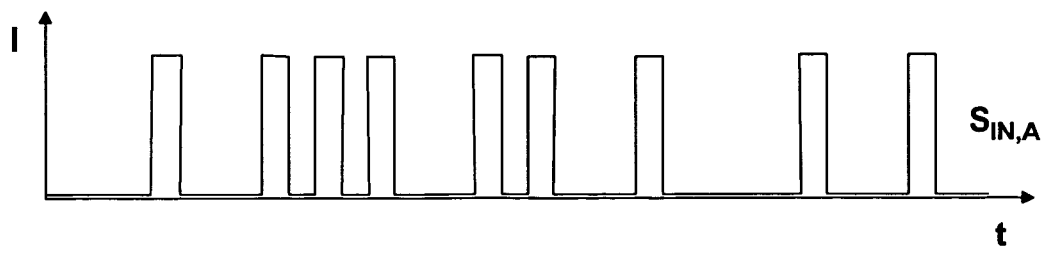
FIG. 6 shows an optical data signal modulated according to the data signal of FIG. 4.

FIG. 6 shows schematically an optical input signal $S_{IN,A}$. The optical data signal $S_{IN,A}$ may be formed in the optical transmitter 200 (FIG. 1) by multiplying a continuous optical signal having a frequency $v_{0,A}$ with the data signal DATA. The spectral composition of the data signal $S_{IN,A}$ exhibits a central component at the frequency $v_{0,A}$ and also sideband components corresponding to FIG. 5.

FIG. 7 shows schematically the processing of the optical data signals $S_{IN,A}$, $S_{IN,B}$. The uppermost curve of FIG. 7 shows, by way of example, the spectral composition of the optical signal $S_{IN}$. The optical signal $S_{IN}$ comprises at least two optical data signals $S_{IN,A}$ and $S_{IN,B}$. The spectrum of the first data signal $S_{IN,A}$ exhibits a spectral peak at a reference frequency $v_{0,A}$, which in this case is equal to the carrier frequency of the first data signal $S_{IN,A}$. Due to the modulation of the signal there are also typically at least two sideband peaks at the frequencies $v_{-1,A}$ and $v_{1,A}$.

The second data signal $S_{IN,B}$ comprises a spectral peak at a reference frequency $v_{0,B}$, which in this case is equal to the carrier frequency of the second data signal $S_{IN,B}$. Due to the modulation of the signal there are also typically at least two sideband peaks at the frequencies $v_{-1,B}$ and $v_{1,B}$, respectively.

The signal spectrum may comprise further peaks, but they have been omitted for the sake of clarity from FIG. 7.

There may be more spectral peaks than those shown in FIG. 7. Based on the known format of modulation and the known format of the data, the person skilled in the art is able to select which one(s) of the side peaks corresponds to the clock frequency. Typically, the clock frequency is equal to the lowest modulation frequency (See FIG. 5).

The difference $\Delta v_{01} = v_{1,A} - v_{0,A}$, and the difference $v_{0,A} - v_{-1,A}$ are equal to the clock frequency $v_{CLK,A}$ associated with the optical data signal $S_{IN,A}$. $\Delta v_{01}$ denotes the difference $v_{1,A} - v_{0,A}$.

Referring to the second curve from the top in FIG. 7, the optical resonator 100 has several adjacent pass bands PB. One of the pass bands PB is set to a spectral peak of the first data signal $S_{IN,A}$. TR denotes transmittance, i.e. the ratio of the transmitted intensity to the input intensity.

The separation of the pass bands PB is equal to the separation range $\Delta v_{SR}$. According to the present invention, the separation range $\Delta v_{SR}$ of the optical resonator 100 is selected such that the clock frequency $v_{CLK,A}$ associated with at least one data signal $S_{IN,A}$ is substantially equal to the separation range of the optical resonator multiplied by a first integer greater than or equal to two.

In order to process the first data signal $S_{IN,A}$ and the second data signal $S_{IN,B}$ simultaneously by using the same optical resonator 100, the spectral separation $\Delta v_{AB}$ between said spectral peak of the first data signal $S_{IN,A}$ and a spectral peak of the second data signal $S_{IN,A}$ has to be substantially equal to the separation range $\Delta v_{SR}$ of the optical resonator 100 multiplied by a second integer.

Advantageously, the spectral components belonging to the adjacent data signals $S_{IN,A}$, $S_{IN,B}$ are spectrally separated and do not overlap. In case of FIG. 7 this sets a requirement that said second integer is greater than or equal to four.

Referring to the third curve from the top in FIG. 7, the frequency separation unit separates the first output $S_{OUT,A}$ from the output $S_{OUT}$ of the optical resonator 100. The output $S_{OUT,A}$ consists of a reference signal $S_{REF,A}$ at a reference frequency $v_{REF,A}$ and the sideband signal at the frequencies $v_{1,A}$, $v_{1,A}$. The output $S_{OUT,A}$ exhibits beat at the clock frequency $v_{CLK,A}$, and it may be used as the clock signal.

Referring to the lowermost curve in FIG. 7, the frequency separation unit may separate also the second output $S_{OUT,B}$ from the output $S_{OUT}$ of the optical resonator 100. The output $S_{OUT,B}$ consists of a reference signal $S_{REF,B}$ at a reference frequency $v_{REF,B}$ and the sideband signal $S_{SIDE,B}$ at the frequencies $v_{-1,B}$, $v_{1,B}$.

Figure 8:
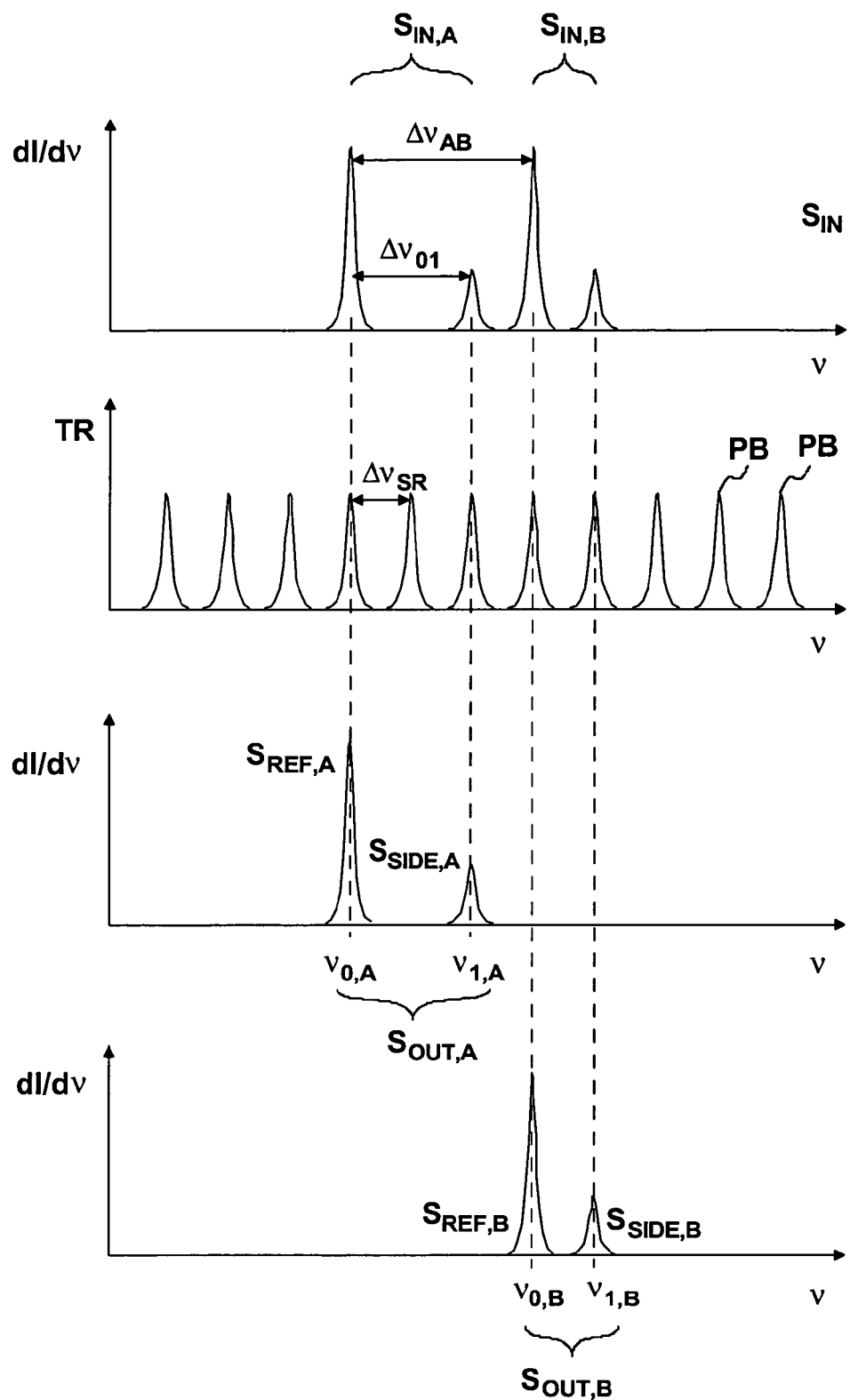
FIG. 8 shows schematically the processing of the optical signals when only right-hand sidebands of the optical data signals are transmitted.

In the typical case each optical data signal $S_{IN,A}$, $S_{IN,B}$ is associated with two sideband peaks. However, some of the spectral components may be filtered out prior to the transmission in order to save the bandwidth of the transmission path 240 (FIG. 1). Referring to FIG. 8, the signals $S_{IN,A}$, $S_{IN,B}$ may have one-sided truncated spectrum. In that case it is possible to reduce the spectral separation $\Delta v_{AB}$ between said spectral peak of the first data signal $S_{IN,A}$ and a spectral peak of the second data signal $S_{IN,A}$ such that the spectral separation $\Delta v_{AB}$ is substantially equal to the separation range $\Delta v_{SR}$ of the optical resonator 100 multiplied by a second integer greater than or equal to three.

Now, the formation of the beat signal is discussed. Referring to the third curve from the top in FIG. 8, the electric field $E_{OUT,A}$ of the first optical output signal $S_{OUT,A}$ is a superposition:

$$E_{OUT,A}(t) = E_{1,A} \exp(j2\pi v_{1,A} t) + E_{0,A} \exp(j2\pi v_{0,A} t), \quad (2)$$

where $E_{0,A}$ is the amplitude of the electric field of the reference signal $S_{REF,A}$, and $E_{1,A}$ is the amplitude of the electric field of the sideband signal $S_{SIDE,A}$. The reference signal $S_{REF,A}$ has a frequency $v_{0,A}$ and the sideband signal $S_{SIDE,A}$ has a frequency $v_{1,A}$.

The intensity $I_{OUT,A}$ of the output signal $S_{OUT,A}$ is given by $$I_{OUT,A}(t) \propto E_{OUT,A}(t) E^*_{OUT,A}(t), \quad (3)$$

$$I_{OUT,A}(t) \propto E_{1,A}^2 + E_{0,A}^2 + 2 E_{1,A} E_{0,A} \cos[2\pi(v_{1,A} - v_{0,A})t] \quad (4)$$

$$I_{OUT,A}(t) \propto E_{1,A}^2 + E_{0,A}^2 + 2 E_{1,A} E_{0,A} \cos(2\pi v_{CLK,A} t) \quad (5)$$

Thus, the intensity of the first output signal $S_{OUT,A}$ exhibits a substantially sinusoidal beat at the clock frequency $v_{CLK,A}$. The last term in the equations (4) and (5) is called the beat term.

The output signal $S_{OUT,A}$ exhibits the beat a the clock frequency $v_{CLK,A}$ also in the case of two-sided sidebands, as shown in FIG. 7.

The optical resonator 100 has a capability to store optical energy. This phenomenon is now discussed with reference to the resonator according to FIG. 3. However, the discussion is relevant also regarding other types of optical resonators. Photons coupled into the resonator according to FIG. 3 pass, in average, several times back and forth between the reflectors 5, 6 before escaping from the cavity 7. Thus, the resonator 100 can sustain its state for some time regardless of perturbations of the optical input signal $S_{IN}$. The time constant $\tau$ of the resonator 100 is given by the equation $$\tau = \frac{L}{-c \ln(r)}, \quad (6)$$

where L is the optical length of the cavity 7 (physical distance multiplied by the refractive index) between the reflectors 5, 6, c is the speed of light in vacuum and r is the reflectance of the reflectors 5, 6. For example, by selecting the parameters r=0, 99 and L=1 mm, the time constant τ of the resonator is 332 picoseconds.

Advantageously, the time constant τ is selected to be greater than or equal to the average time period during which the optical input signal $S_{IN}$ does not change its state.

In case of return-to-zero (RZ) signals, the time constant τ is advantageously selected to be greater than or equal to the average time period during which the optical data signal $S_{IN,A}$ remains at zero.

In general, for example in the case of non-return-to-zero (NRZ) signals, the time constant τ is advantageously selected to be greater than or equal to the average time period during which the optical data signal $S_{IN,A}$ does not change its state.

Figure 9:
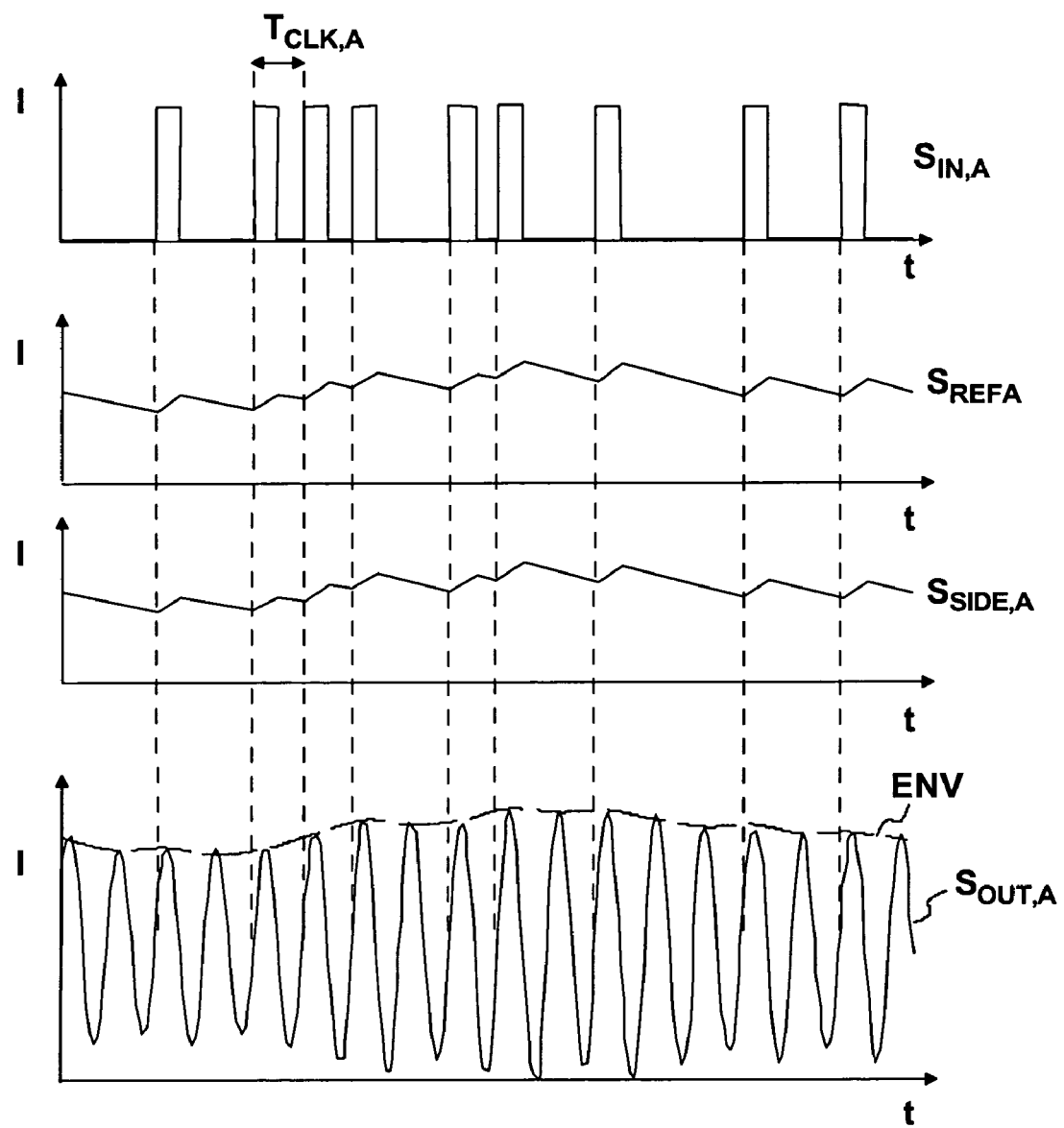
FIG. 9 shows the temporal behavior of a reference signal, a sideband signal and a beat signal corresponding to the optical data signal according to FIG. 6.

FIG. 9 shows the temporal behavior of a sideband signal $S_{SIDE,A}$, a reference signal $S_{REF,A}$ and an output signal $S_{OUT,A}$ corresponding to a return-to-zero-modulated data signal $S_{IN,A}$. The uppermost curve shows, by way of example, the data signal $S_{IN,A}$. The second curve from the top shows the temporal behavior of the reference signal $S_{REF,A}$. The third curve from the top shows the temporal behavior of the sideband signal $S_{SIDE,A}$. The intensities of the reference signal $S_{REF,A}$ and the sideband signal $S_{SIDE,A}$ decrease when no optical energy is delivered to the optical resonator 100. In other words, the optical resonator 100 is discharged. The intensities of the reference signal $S_{REF,A}$ and the sideband signal $S_{SIDE,A}$ increase when optical energy is delivered to the optical resonator 100. In other words, the optical resonator 100 is charged.

The lowermost curve shows the temporal behavior of the output signal $S_{OUT,A}$. The output signal $S_{OUT,A}$ exhibits beat at the clock frequency $v_{CLK,A}$ corresponding to the optical data signal $S_{IN,A}$. The envelope ENV of the output signal $S_{OUT,A}$ fluctuates according to the fluctuating signals $S_{REF,A}$ and $S_{SIDE,A}$.

It is emphasized that although the envelope ENV of the output signal intensity fluctuates, the amplitude of the beat of the output signal approaches zero only if the data signal $S_{IN,A}$ is at zero for a long time. Thus, the beat output signal $S_{OUT,A}$ can be used as an uninterrupted clock signal.

The optical resonator 100 may be implemented using optical resonators known by the person skilled in the art. Suitable optical resonators are disclosed e.g. in an article "Optical Tank Circuits Used for All-Optical Timing Recovery" by M. Jinno, T. Matsumoto, IEEE Journal of Quantum Electronics, Vol. 28, No. 4 Apr. 1992 pp. 895-900. The tuning of the pass bands PB may be performed by methods known by the person skilled in the art.

Referring back to FIG. 3, the separation range $\Delta v_{SR}$ of the optical resonator 100 and the spectral position of a predetermined pass band PB may be tuned by adjusting the optical length of the cavity 7. The methods may comprise e.g. controlling temperature, pressure, electric field, voltage, current, mechanical deformation of the cavity or displacement of the reflectors 5, 6. The cavity 7 may comprise material, whose refractive index depends on electric field, e.g. liquid crystals, KDP, $LiNbO_3$, or BBO. Thus, the optical properties of the material may be controlled by applying electric field over the material.

Further, the spectral position of the pass bands PB of the optical resonator 100 may be stabilized with respect to predetermined frequencies of the optical data signals $S_{IN,A}$, $S_{IN,B}$. The stabilization may be performed e.g. by adjusting the length of the cavity 7, or by another above-mentioned method such that the amplitudes of one or more beat signals are maximized.

In case of stable signal frequencies, also external frequency references may be used to stabilize the positions of the pass bands PB of the optical resonator 100. For example, a frequency-stabilized laser may be used as a frequency reference.

An optical resonator may have active feedback means to tune the wavelength position of the pass bands PB. An optical resonator may be manufactured to provide the desired positions of the passbands PB. An optical resonator may be selected from among several resonators to provide the desired positions of the passbands PB. An optical resonator may have a replaceable component to implement the desired positions of the passbands PB.

Figure 10:
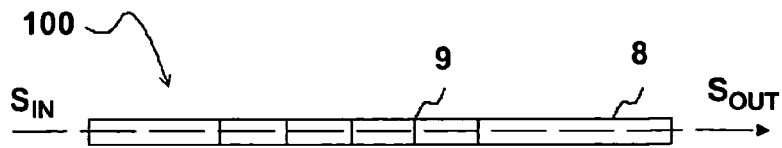
FIG. 10 shows schematically an optical resonator based on a fiber optic grating.

Referring to FIG. 10, the optical resonator 100 may be implemented using a fiber optic grating. The fiber optic grating comprises a portion of optical waveguide 8 comprising periodic features 9.

Figure 11:
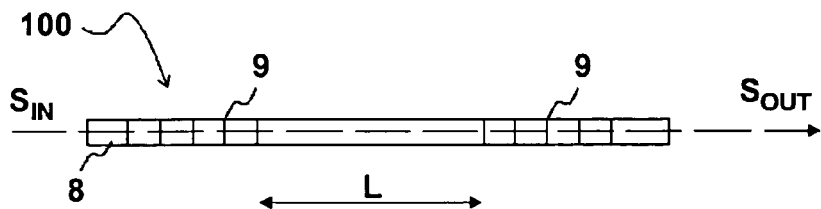
FIG. 11 shows schematically an optical resonator based on two gratings.

Referring to FIG. 11, the optical resonator 100 may be implemented using structure which comprises two gratings, said gratings defining a cavity between them. The gratings may be Bragg gratings.

Figure 12:
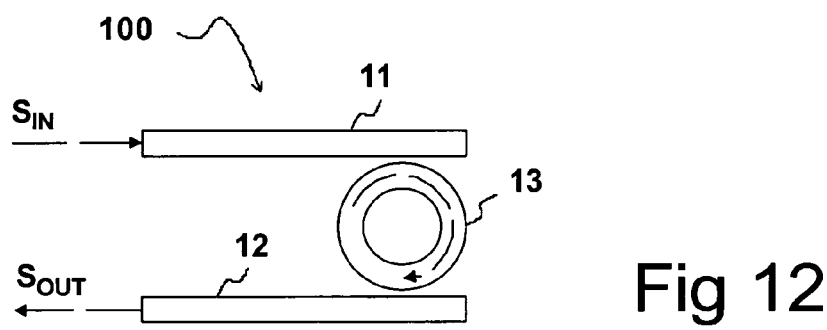
FIG. 12 shows schematically an optical resonator based on a micro ring.

Referring to FIG. 12, the optical resonator 100 may be implemented using a micro ring resonator. Waveguides 11, 12 may be arranged to couple light in and out from a micro ring 13, said micro ring 13 forming an optical resonator. Light may be coupled to and from the waveguides and other optical components, such as the ring resonators 13, by evanescent coupling.

Figure 13:
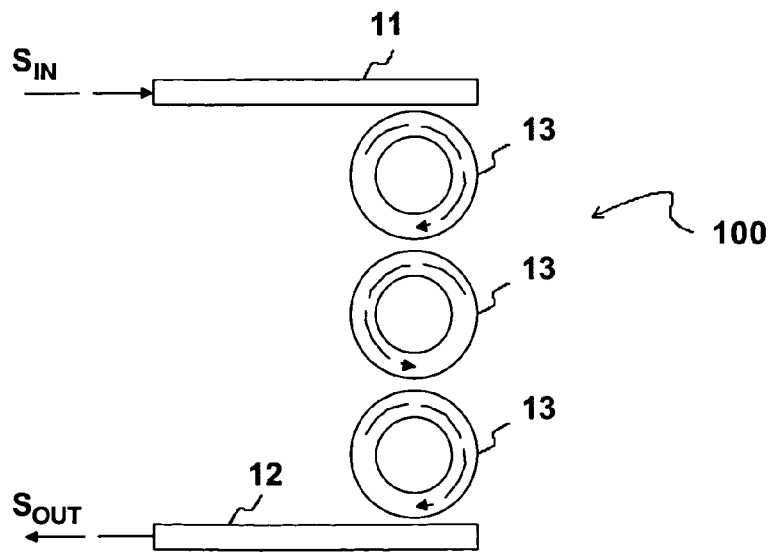
FIG. 13 shows schematically an optical resonator based on a plurality of optically coupled micro rings.

Referring to FIG. 13, the optical resonator 100 may be implemented using a plurality of optically coupled resonators, e.g. micro ring resonators.

The optical resonator 100 may also be implemented using a resonator formed based on a fiber loop or a portion of a fiber defined between two reflectors (not shown). The optical resonator 100 may also be based on a grating based device, a monochromator, an arrayed waveguide grating, a periodic microstructure, a stack of thin films, or a combination thereof.

The optical resonator 100 may be used in the transmissive mode or in the reflective mode.

Figure 14:
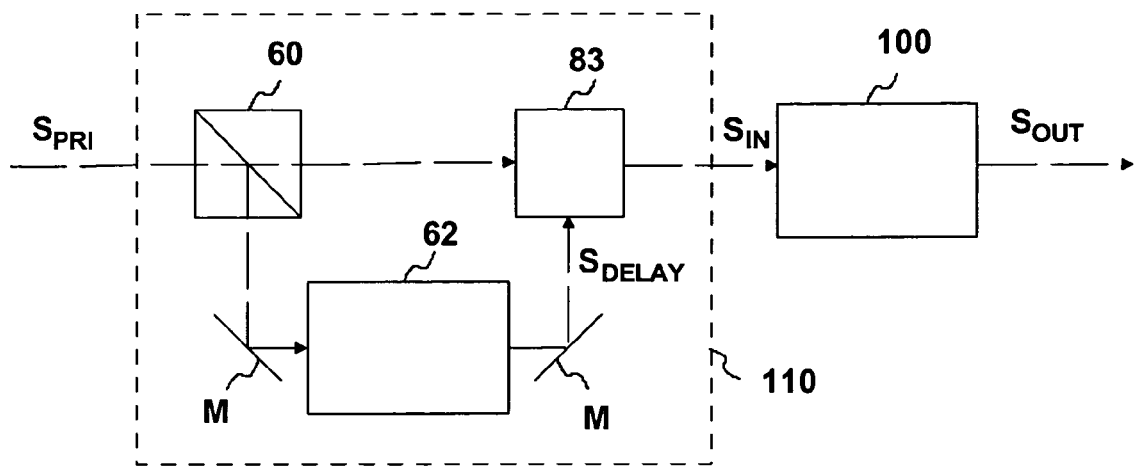
FIG. 14 shows the block diagram of a pre-processing unit coupled to an optical resonator.

An optical signal may also be modulated in such a way that it does not originally comprise spectral components corresponding to the clock frequency. The optical signal may be modulated e.g. according to the non-return-to-zero (NRZ) format. Referring to FIG. 14, a pre-processing unit 110 may be coupled to the optical resonator 100 in order to provide an optical data signal $S_{IN}$ which comprises a spectral component associated with the clock frequency.

The pre-processing unit 110 may comprise a delay line 62 and an optical combiner 83. A primary signal $S_{PRI}$ may be delayed to provide a delayed signal $S_{DELAY}$. The delayed signal $S_{DELAY}$ may be combined with the original undelayed primary signal $S_{PRI}$ to perform an exclusive-OR-operation of the delayed and undelayed signals. Consequently, an optical data signal $S_{IN}$ may be provided which comprises a frequency component associated with the clock frequency. Such an arrangement is disclosed e.g. in an article "All-Optical Clock Recovery from NRZ Data of 10 Gb/s", by H. K. Lee, J. T. Ahn, M.-Y. Jeon, K. H. Kim, D. S. Lim, C.-H. Lee, IEEE Photonics Technology Letters, Vol. 11 No. 6 June 1999 pp. 730-732. The pre-processing unit 110 may comprise a splitter 60 to divide the primary signal $S_{PRI}$ into two parts. Mirrors M may be used for guiding light.

The pre-processing unit 110 may also be implemented by non-linear devices such as disclosed e.g. in U.S. Pat. No. 5,339,185.

Figure 15:
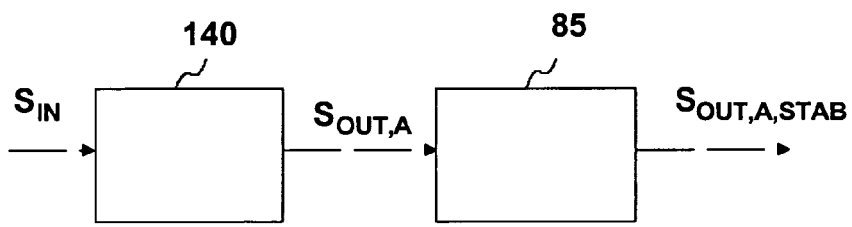
FIG. 15 shows the block diagram of a output stabilization unit coupled to the clock signal recovery device.

Referring to FIG. 15, an amplitude stabilization unit 85 may be coupled to the clock recovery device 140 in order to stabilize the amplitude of the beating output signal $S_{OUT,A}$ and/or to stabilize the waveform of the beating output signal $S_{OUT,A}$. The stabilization unit 85 may be based on an optical resonator exhibiting optical bistability. The stabilization unit 85 may be based on an optically saturable element. The stabilization unit 85 may be based on the use of one or more semiconductor optical amplifiers.

Figure 16:
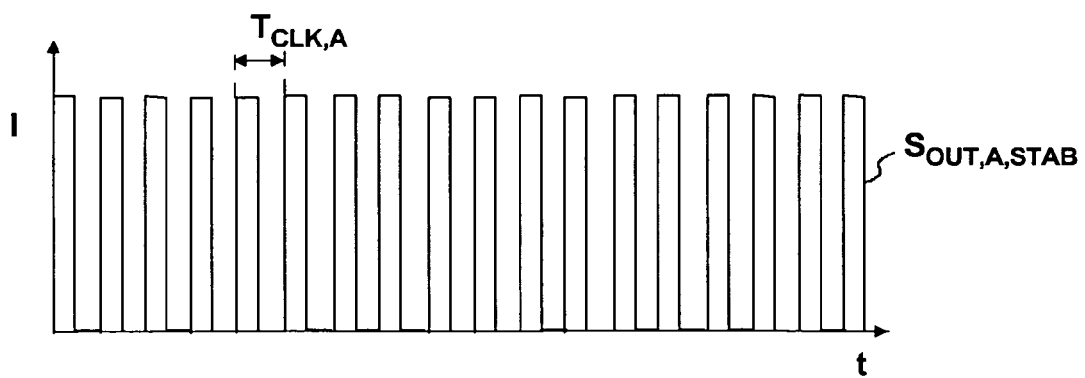
FIG. 16 shows, by way of example, an output signal which is stabilized with respect to the beat amplitude.

FIG. 16 shows, by way of example an output signal $S_{OUT,A,STAB}$, which is stabilized with respect to the beat amplitude. FIG. 16 corresponds to the unstabilized signal shown by the lowermost curve of FIG. 8.

The clock recovery device 140 may be used in combination with optical data receivers, repeaters, transponders or other type of devices used in fiber optic networks. The clock recovery device 140 may also be used in combination with optical data receivers, repeaters, transponders or other type of devices used in optical communication systems operating in free air or in space.

The optical transmission path 240 may be an optical fiber, an optical fiber network, light transmissive material, liquid, gas or vacuum. The transmission path 240 may be used for one-directional or two-directional communication.

The clock recovery device 140 may be implemented using fiber optic components. The clock recovery device 140 may be implemented using separate free-space optical components. The optical resonators 100 may e.g. comprise a pair of dielectric-coated mirrors separated by a gas such as air, or vacuum. The cavity 7 of the optical resonator 100 may comprise transparent dielectric liquid and/or solid material. The clock recovery device 140 may be implemented with methods of integrated optics on a solid-state substrate using miniaturized components. The clock recovery device 140 is understood to comprise optical paths between the optical components, said paths being implemented by free-space optical links, liquid or solid-state optical waveguides, and/or optical fibers. The optical resonator 100, the spectral separation unit 120 and/or further optical components may be implemented on the same substrate.

The clock recovery device 140 may further comprise light-amplifying means to amplify the optical input signals and/or output signals. The light amplifying means may be implemented by e.g. rare-earth doped materials or waveguides. The light amplifying means may be a semiconductor optical amplifier.

Referring back to FIG. 2, the frequency separation unit 120 may be omitted when the output $S_{OUT}$ of the optical resonator 100 is coupled to a receiver 280 and/or to further all-optical devices which comprise spectral separation capabilities.

Figure 17:
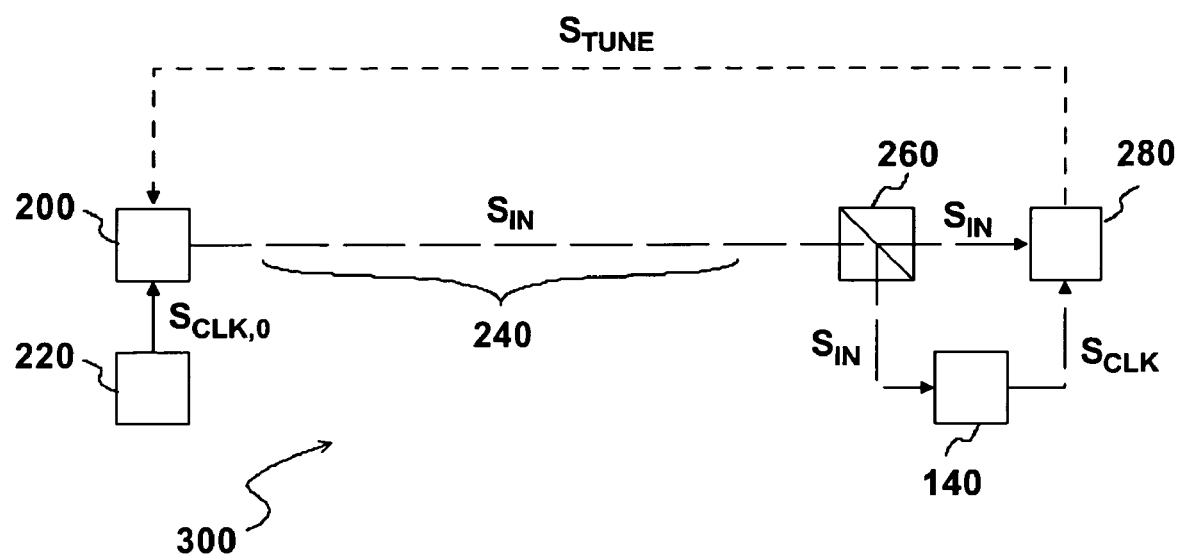
FIG. 17 shows a block diagram of a communication system comprising means to transmit control information to an optical transmitter.

At least one of the pass bands PB of the optical resonator 100 has to coincide with a spectral peak of the data signal $S_{IN,A}$. Referring to FIG. 17, the spectral matching may be obtained by spectrally tuning the resonator 100 and/or by spectrally tuning the transmitter 200. However, the tuning of the transmitter requires control information from the receiver 280. The control information may be based e.g. on the magnitude of the beat signal. The transmitter 200 may be tuned such that the magnitude of the beat signal is maximized. The control information may be sent optically through the same optical transmission path 240 which is used for the data signal $S_{IN,A}$. The control information may be sent optically through another transmission path. The control information may also be sent electrically or by radio communication.

Thus, the optical system may further comprise:
means to monitor the spectral position of a spectral peak of the first data signal $S_{IN,A}$ with respect to at least one pass band of the optical resonator,
means to send control information $S_{TUNE}$ to the optical transmitter 200, which control information $S_{TUNE}$ is based on said spectral position, and
means to stabilize said spectral position based on said control information $S_{TUNE}$.

The optical signal $S_{IN}$ may comprise data sent at several optical channels, i.e. associated with different reference wavelengths. The method according to the present invention may be used to recover clock frequencies simultaneously, i.e. parallel in time domain, associated with said several optical signals, respectively.

Spectral positions of optical channels in fiber optic networks have been standardized e.g. by the International Telecommunication Union. The separation between optical channels, i.e. the separation $\Delta v_{AB}$ between the reference frequencies $v_{0,A}$, $v_{0,B}$ may be e.g. 100 GHz in the frequency domain.

Assuming, by way of example, that
the separation $\Delta v_{AB}$ between the reference frequencies of two adjacent data signals is 100 GHz,
the separation range $\Delta v_{SR}$ of the optical resonator is 10 GHz, and that
the clock frequency of the second data signal is 10 GHz, then one of the following clock frequencies may be recovered for the first data signal: 10 GHz, 20 GHz, 30 GHz, 40 GHz, 50 GHz, 60 GHz, 70 GHz, 80 GHz, or 90 GHz.

The clock recovery device 140 and the clock recovery method according to the present invention may be used to simultaneously recover clock frequencies associated with several optical data signals, which signals have different reference frequencies, and which may have different data rates and/or different formats of modulation.

In general, the separation $\Delta v_{AB}$ between two adjacent optical channels may be expressed by an equation:

$$\Delta v_{AB} = \frac{m_2}{m_1} v_{CLK,A}, \quad (7)$$

where $m_1$ is a first integer greater than or equal to two and, $m_2$ is a second integer, and $v_{CLK,A}$ is the clock frequency associated with one of said two adjacent channels. In other words, the channel separation may be substantially equal to the clock frequency multiplied by a rational number.

Figure 18:
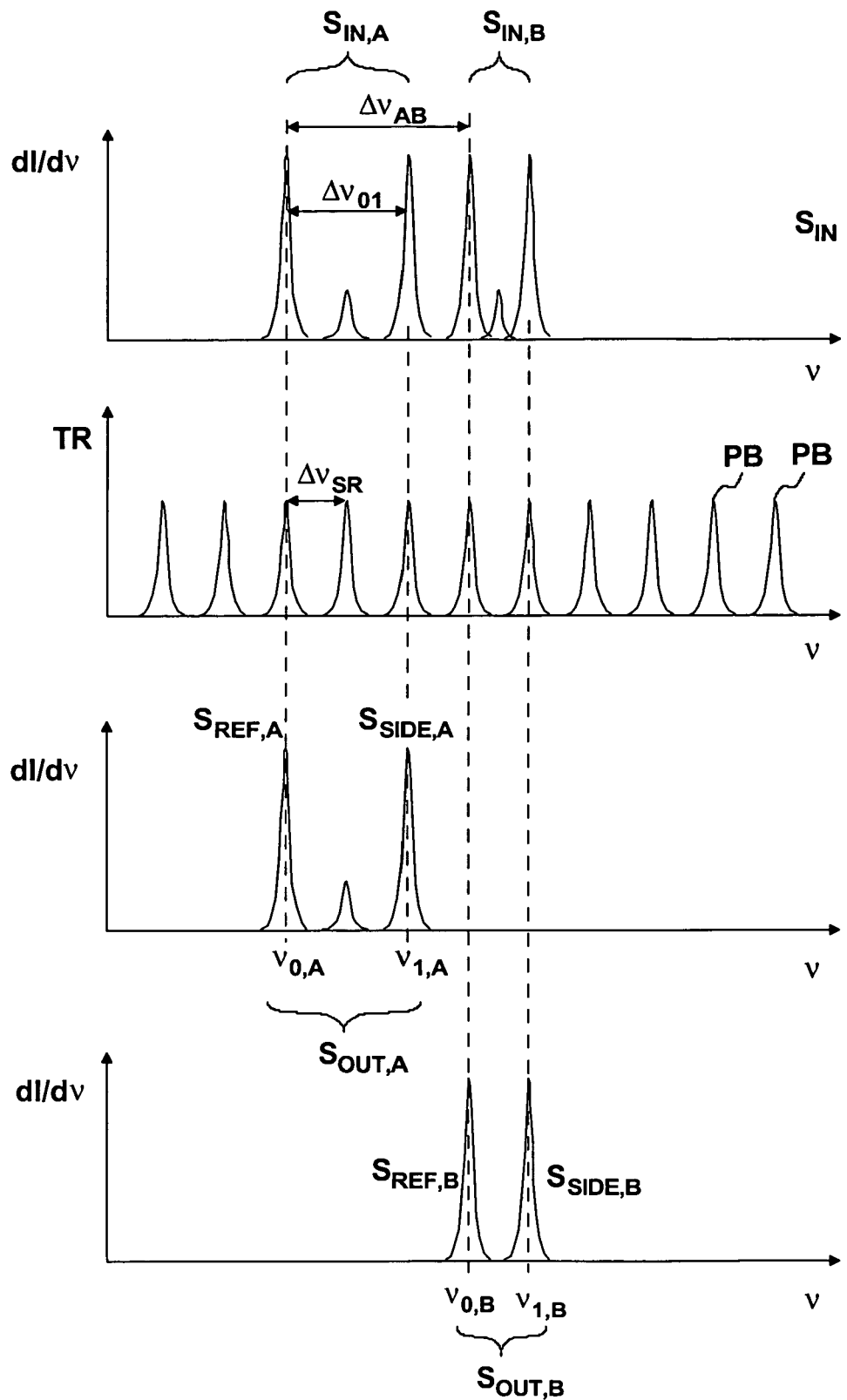
FIG. 18 shows schematically processing of carrier-suppressed data signals.

In further embodiment of the invention, data signals $S_{IN,A}$, $S_{IN,B}$ may be modulated in such a way that the spectral component at the carrier wavelength is substantially or completely suppressed. Referring to FIG. 18, the first data signal $S_{IN,A}$ comprises two sideband peaks at the frequencies $v_{0,A}$ and $v_{1,A}$, and a substantially suppressed carrier peak between the sideband peaks. Also the second data signal $S_{IN,A}$ may comprises two sideband peaks at the frequencies $v_{0,B}$ and $v_{1,B}$, and a substantially suppressed carrier peak between the sideband peaks. A signal modulated according to the carrier-suppressed-return-to-zero-format (CSRZ) exhibits this kind of spectrum.

One of the pass bands PB of the optical resonator 100 is set to a spectral peak of the first data signal $S_{IN,A}$. Said spectral peak may be e.g. at the frequency $v_{0,A}$.

The separation range $\Delta v_{SR}$ of the optical resonator 100 is selected such that the clock frequency $v_{CLK,A}$ of the first data signal $S_{IN,A}$ is substantially equal to the separation range $\Delta v_{SR}$ of the optical resonator 100 multiplied by a first integer m1 greater than or equal to two.

In order to process the first data signal $S_{IN,A}$ and the second data signal $S_{IN,B}$ simultaneously by using the same optical resonator 100, the spectral separation $\Delta v_{AB}$ between said spectral peak of the first data signal $S_{IN,A}$ and a spectral peak of the second data signal $S_{IN,A}$ has to be substantially equal to the separation range $\Delta v_{SR}$ of the optical resonator 100 multiplied by a second integer.

Referring to the example shown in FIG. 18, spectral overlapping of the first and the second data signals $S_{IN,A}$, $S_{IN,B}$ may be avoided when the separation between the left-hand spectral peak of the first data signal and the left-hand spectral peak of the second data signal is substantially equal to the separation range of the optical resonator multiplied by a second integer $m_2$, which second integer $m_2$ is greater than said first integer $m_1$.

Figure 19:
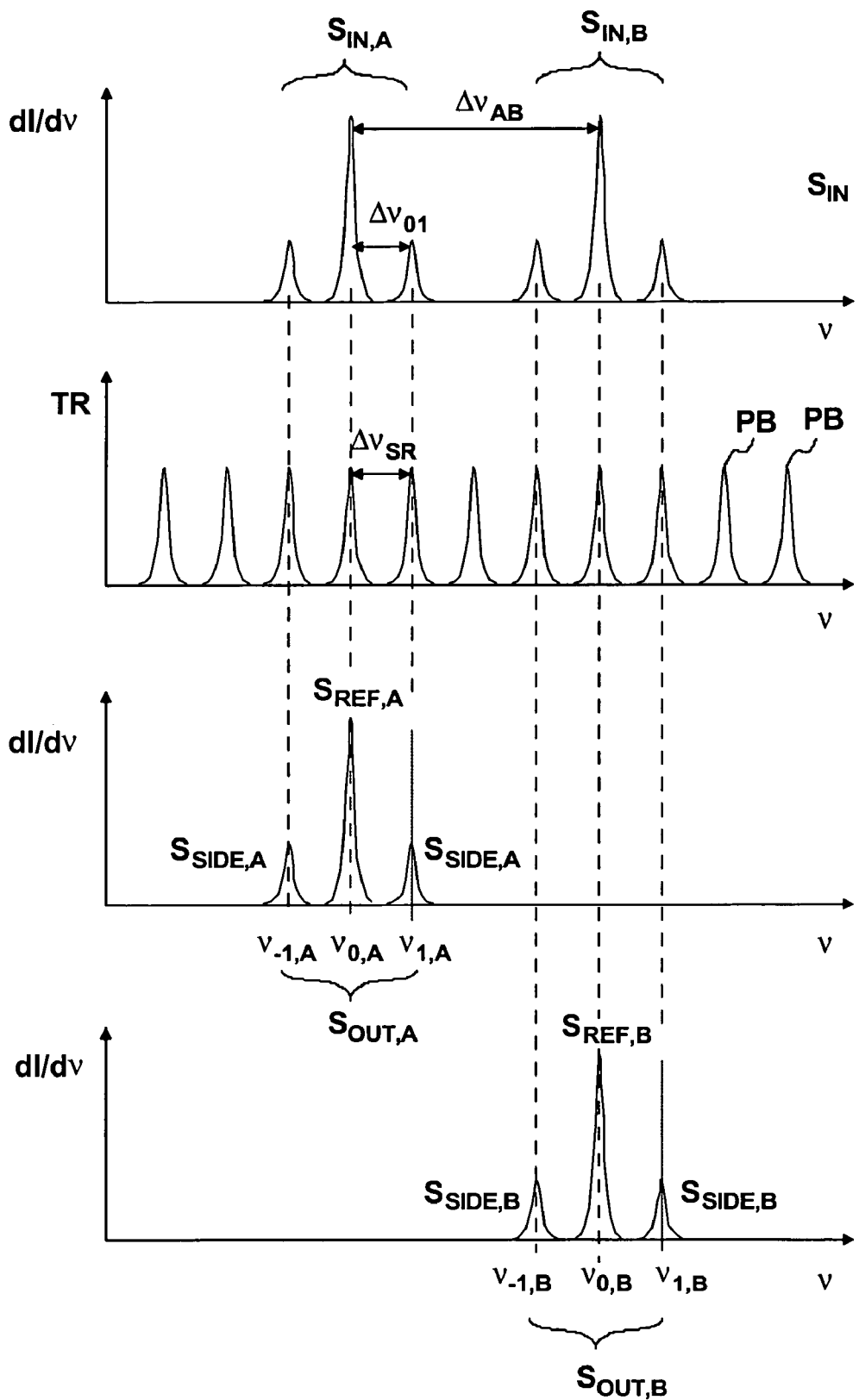
FIG. 19 shows prior art processing of the optical data signals.

FIG. 19 shows a prior art way to recover the clock frequency. When compared with FIGS. 7 and 8, the clock frequency associated with the first data signal is substantially equal to the separation range of the optical resonator multiplied by one. Consequently, the adjacent channels must have the same clock frequency, and the channel separation has to be an integer multiple of the clock frequency.

For a person skilled in the art, it will be clear that modifications and variations of the devices and the method according to the present invention are perceivable. The particular embodiments described above with reference to the accompanying drawings are illustrative only and not meant to limit the scope of the invention, which is defined by the appended claims.

What is claimed is:

1. A method to recover at least one optical clock frequency associated with an optical signal, said optical signal comprising a first data signal, and a second data signal, said method comprising:
    coupling said optical signal to an optical resonator,
    setting one of the pass bands of the optical resonator substantially to a spectral peak of the first data signal,
    selecting the separation range of said optical resonator such that
        a clock frequency of the first data signal is substantially equal to the separation range of the optical resonator multiplied by a first integer greater than or equal to two, and such that
        a separation between said spectral peak of the first data signal and a spectral peak of the second data signal is substantially equal to the separation range of the optical resonator multiplied by a second integer; and
    coupling an output signal out of said optical resonator, wherein said output signal comprises a beat signal having a beat frequency that is equal to the clock frequency of said first data signal, and wherein a spectral position of said beat signal coincides with spectral components of said first data signal.

2. The method according to the claim 1 further comprising separating frequency components associated with said first data signal from the output of said optical resonator to provide a beat signal.

3. An optical systems comprising:
    an optical transmitter adapted to send an optical signal comprising at least a first data signal and a second data signal, and
    an optical resonator, wherein a pass band of the optical resonator is adapted to be substantially at a spectral peak of the first data signal, and a separation range of the optical resonator is adapted such that
        a clock frequency of the first data signal is substantially equal to the separation range of the optical resonator multiplied by a first integer greater than or equal to two, and such that
        a separation between the spectral peak of the first data signal and a spectral peak of the second data signal is substantially equal to the separation range of the optical resonator multiplied by a second integer
    wherein said optical resonator is arranged to provide an output signal comprising a beat signal having a beat frequency that is equal to the clock frequency of said first data signal, and wherein a spectral position of said beat signal coincides with spectral components of said first data signal.

4. The system according to the claim 3 further comprising frequency separating means to provide a beat signal by separating from the output of said optical resonator frequency components associated with said first data signal.

5. The system according to the claim 3 wherein said spectral peak of the first data signal is at the carrier frequency of the first data signal.

6. The system according to the claim 5 wherein said spectral peak of the second data signal is at the carrier frequency of the second data signal.

7. The system according to the claim 3 wherein said spectral peak of the first data signal is at a sideband frequency of the first data signal.

8. The system according to the claim 3 wherein the time constant of said optical resonator is greater than or equal to an average time period during which said first data signal does not change its state.

9. The system according to the claim 3, further comprising:
    a stabilization unit to stabilize the amplitude of said beat signal.

10. The system according to the claim 9 wherein said stabilization unit comprises a component selected from among a semiconductor optical amplifier, an optically saturable element, and an optical resonator exhibiting optical bistability.

11. The system according to the claim 3, further comprising:
    a stabilization unit to reshape the waveform of said beat signal.

12. The system according to the claim 3 further comprising a pre-processing unit to generate at least one further spectral peak based on an optical primary signal.

13. The system according to claim 12, wherein said pre-processing unit comprises:
    a delay unit to provide a delay signal by delaying said optical primary signal, and
    an optical combiner to provide an exclusive-OR function of said delay signal and said optical primary signal.

14. The system according to claim 12, wherein said optical primary signal is modulated according to the non-return-to-zero-format, said at least one further spectral peak corresponding to the clock frequency of said optical primary signal.

15. The system according to claim 3 wherein at least one data signal is modulated according to the return-to-zero format.

16. The system according to the claim 3 wherein at least one data signal is amplitude-modulated.

17. The system according to the claim 3 wherein at least one data signal is phase-modulated.

18. The system according to claim 3 wherein at least two data signals have different clock frequencies.

19. The system according to claim 3 wherein the spectral separation between the first data signal and the second data signal is selected according to a standard set for optical telecommunication channels in fiber optic networks by the International Telecommunication Union.

20. The system according to the claim 3 further comprising a frequency stabilization unit to stabilize the spectral position of the resonance peaks of the optical resonator with respect to at least one carrier frequency.

21. The system according to the claim 3 further comprising:
means to monitor the spectral position of the spectral peak of the first data signal with respect to at least one pass band of the optical resonator,
means to send control information to the optical transmitter, which control information is based on said spectral position, and
means to stabilize said spectral position based on said control information.

22. The system according to the claim 3 wherein the separation range of the optical resonator is adjustable.

23. The system according to the claim 3 wherein the optical resonator comprises an optical cavity defined by at least two reflectors.

24. The system according to the claim 3 wherein the optical resonator comprises at least one periodic structure.

25. The system according to the claim 3 wherein the optical resonator is selected from the group of a micro ring resonator, a sphere resonator and a toroid resonator.

26. The system according to the claim 3 wherein the optical resonator comprises several optical resonators, which are optically coupled together.

27. A device to recover at least one clock frequency associated with an optical signal, said optical signal comprising a first data signal, and a second data signal, said device comprising:
an optical resonator, wherein a resonance peak of the optical resonator is adapted to be substantially at a spectral peak of the first data signal, a separation range of the optical resonator being adapted such that
a clock frequency of the first data signal is substantially equal to the separation range of the optical resonator multiplied by a first integer greater than or equal to two, and such that
a separation between said spectral peak of the first data signal and a spectral peak of the second data signal is substantially equal to the separation range of the optical resonator multiplied by a second integer
wherein said optical resonator is arranged to provide an output signal comprising a beat signal having a beat frequency that is equal to the clock frequency of said first data signal, and wherein a spectral position of said beat signal coincides with spectral components of said first data signal.

28. The device according to the claim 27 further comprising
frequency separating means to provide a beat signal by separating from the output of said optical resonator frequency components associated with said first data signal.

* * * * *